US007001946B2

(12) United States Patent
Steiner et al.

(10) Patent No.: US 7,001,946 B2
(45) **Date of Patent: *Feb. 21, 2006**

(54) TIRE WITH TREAD OF NATURAL RUBBER-RICH RUBBER COMPOSITION

(75) Inventors: Pascal Patrick Steiner, Diekirch (LU); Tom Dominique Linster, Gilsdorf (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 349 days.

This patent is subject to a terminal disclaimer.

(21) Appl. No.: 10/368,258

(22) Filed: Feb. 17, 2003

(65) Prior Publication Data

US 2004/0162382 A1 Aug. 19, 2004

(51) Int. Cl.
*C08K 3/04* (2006.01)
*C08F 136/04* (2006.01)

(52) U.S. Cl. ...................... 524/496; 524/495; 524/493; 525/332.9; 525/333.1; 525/333.2; 152/209.1

(58) Field of Classification Search ................ 524/495, 524/496, 493; 525/333.1, 333.2, 332.9
See application file for complete search history.

(56) References Cited

U.S. PATENT DOCUMENTS

| | | | | |
|---|---|---|---|---|
| 6,211,271 | B1 * | 4/2001 | Garro et al. | 524/269 |
| 6,872,772 | B1 * | 3/2005 | Steiner et al. | 524/526 |
| 2002/0011293 | A1 * | 1/2002 | Zanzig et al. | 152/209.16 |

FOREIGN PATENT DOCUMENTS

| | | |
|---|---|---|
| EP | 829511 | 3/1998 |
| EP | 896978 | 2/1999 |
| EP | 1033265 | 9/2000 |
| EP | 1077228 | 2/2001 |
| EP | 1188786 | 3/2002 |
| EP | 1231080 | 8/2002 |
| EP | 1254786 | 11/2002 |

OTHER PUBLICATIONS

European Search Report.

* cited by examiner

*Primary Examiner*—Tae H. Yoon
(74) *Attorney, Agent, or Firm*—Henry C. Young, Jr.

(57) ABSTRACT

This invention relates to tires having a tread of a natural rubber-rich rubber composition reinforced with a combination of rubber reinforcing carbon black and precipitated silica in which carbon black is in the majority of such reinforcement. In one aspect, the tread rubber has a balance of physical properties. Such balance of physical properties includes relatively high hardness and abrasion resistance properties balanced with an acceptable rebound property.

4 Claims, No Drawings

TIRE WITH TREAD OF NATURAL RUBBER-RICH RUBBER COMPOSITION

FIELD OF THE INVENTION

This invention relates to tires having a tread of a natural rubber-rich rubber composition reinforced with a combination of rubber reinforcing carbon black and precipitated silica in which carbon black is in the majority of such reinforcement. In one aspect, the tread rubber has a balance of physical properties. Such balance of physical properties includes relatively high hardness and abrasion resistance properties balanced with an acceptable rebound property.

BACKGROUND OF THE INVENTION

A pneumatic tire is a composite of complex structure of interacting components, each with properties intended for suitable effectiveness. One important component of a tire is a tread which designed to be a running surface of the tire.

For this invention, a tire tread is desired which is has relatively high hardness and abrasion resistance properties in combination with a an acceptable internal heat generation property such as, for example, a hot rebound property.

The hardness property relates to the stiffness of the tire tread. The abrasion resistance property can relate to resistance to tread wear for a tire tread.

The hot rebound property can relate to an ability of a tread of relatively high stiffness to resist internal heat generation, with an accompanying temperature rise, which, in turn, may relate to durability of the tire tread under working conditions.

It is appreciated that an optimization of one physical property usually detracts, or retards, at least one other physical property. Accordingly, there is desire to present a tire tread of relatively high hardness and abrasion resistance properties which also presents an acceptable hot rebound property.

For this invention, it is desired to provide a tire tread of a rubber composition having a balance of relatively high stiffness, or hardness, high abrasion resistance and an acceptable hot rebound properties for a tread rubber having such relatively high hardness and abrasion resistance properties. Such balance of physical properties is achieved, at least in part, by use of a natural rubber-rich tire tread rubber composition, together with cis 1,4-polybutadiene and styrene/butadiene copolymer rubber which is reinforced with a reinforcing filler as a combination of high structure rubber reinforcing carbon black and precipitated silica in which the carbon black is in the majority of the reinforcing filler.

In the description of this invention, the terms “rubber” and “elastomer” where used herein, may be used interchangeably, unless otherwise indicated. The terms “rubber composition”, “compounded rubber” and “rubber compound”, where used herein, are used interchangeably to refer to “rubber which has been blended or mixed with various ingredients and materials” and such terms are well known to those having skill in the rubber mixing or rubber compounding art.

In the description of this invention, the term “phr” refers to parts of a respective material per 100 parts by weight of rubber, or elastomer. The terms “rubber” and “elastomer” may be used interchangeably unless otherwise indicated. The terms “cure” and “vulcanize” may be used interchangeably unless otherwise indicated.

The glass transition temperature (Tg) of an elastomer may be determined by DIN 53445 at a heating rate of 1° C. per minute unless otherwise indicted.

SUMMARY AND PRACTICE OF THE INVENTION

In accordance with this invention, a tire is provided having an outer circumferential tread of a natural rubber-rich, carbon black-rich, silica-containing sulfur cured rubber composition which comprises, based upon parts by weight per 100 parts by weight elastomer (phr):

(A) 100 phr of diene-based elastomers as:

(1) about 70 to about 90 phr of cis 1,4-polyisoprene natural rubber having a cis 1,4-content of at least 96 percent and a Tg in a range of about −60° C. to about −70° C., (2) about 5 to about 15 phr of cis 1,4-polybutadiene rubber having a cis 1,4-content of at least 96 percent and a Tg in a range of about −90° C. to about −110° C., and (3) about 5 to about 15 phr of styrene/butadiene copolymer rubber having a styrene content in a range of from about 20 to about 25 weight percent and a Tg in a range of about −40° C. to about −60° C., (B) about 48 to about 76, alternately about 48 to about 67, phr of particulate reinforcing filler as rubber reinforcing carbon black and precipitated silica composed of about 25 to about 40, alternately about 25 to about 35, phr of said carbon black and wherein the weight ratio of said carbon black to said silica in a range of about 1.1/1 to 1.3/1, wherein:

(1) said carbon black has an Iodine value (ASTM D1510) in a range of from about 110 to about 130 mg/g and a dibutyl phthalate (DBP) value (ASTM D2414) in a range of from about 120 to about 140 ml/100 g, and (2) said silica has a nitrogen surface area value (BET) in a range of about 140 to about 180 $m^2/g$, and (C) a coupling agent having a moiety reactive with hydroxyl groups (e.g. silanol groups) contained on the surface of said precipitated silica and another moiety interactive with said diene-based elastomers.

Such coupling agent may, for example, be preferably a bis-(3-triethoxysilylpropyl) polysulfide having an average of from 2 to 2.6 or from 3.5 to 4, preferably from 3.5 to 4, connecting sulfur atoms in its polysulfidic bridge. Such coupling agent may be used, for example, as a weight ratio thereof to said precipitated silica in a range of from 0.1 to about 0.15.

The rubber composition is natural rubber-rich in a sense that at least 70 weight percent of the elastomers is natural cis 1,4-polyisoprene rubber. The high natural rubber content of the rubber composition is intended to aid in promoting stiffness and damage resistance, as well as heat durability, for the rubber composition.

While cis 1,4-polybutadiene rubber is often used in a rubber composition for a tire tread to promote abrasion resistance, for this rubber composition the cis 1,4-polybutadiene rubber content is limited to about 5 to about 15 phr to aid in promoting damage resistance for the tire tread rubber composition.

A third elastomer, namely a styrene/butadiene copolymer rubber preferably prepared by aqueous emulsion polymerization (polymerization of styrene and 1,3-butadiene monomers) is used to aid in promoting tire handling and wet skid (wet traction) performance of the tire tread.

A major portion of the reinforcing filler for the rubber composition is a small particle (high iodine value), high structure (high dibutylphthalate, or DBP, value) carbon black in order to aid in promoting a suitable abrasion resistance. A minor portion of the reinforcing filler is precipitated silica, together with a silica coupling agent, in order to aid in promoting low heat generation, or high hot rebound value, and in promoting damage resistance.

In particular, a high structure carbon black is used which has a relatively high Iodine value and relatively high dibutylphthalate (DBP) value and is thus of a relatively small particle size (the high Iodine value) and of a relatively high structure (the relatively high DPB value). Such carbon black(s) are conventionally used in tire treads to promote abrasion resistance. Representative of such carbon blacks is, for example, N121, an ASTM designation, as reported, together with other rubber reinforcing carbon blacks, in *The Vanderbilt Rubber Handbook*, (1978 edition), on Page 417. Such N121 rubber reinforcing carbon black is reported therein as having a typical iodine value of about 120 mg/g and a typical DBP value of about 130 ml/100 g.

The precipitated silica is a synthetic amorphous silica having a nitrogen (BET) surface area value in a range of about 140 to about 180 $m^2/g$. Such nitrogen surface value may be determined, for example, by the method of Braunauer, Emmett and Teller described in the *Journal of the American Chemical Society*, February 1938, Vol. 60, Page 309.

In practice, it is preferred that the sulfur vulcanized natural rubber rich rubber composition for a tire tread has a beneficial balance of physical properties. Such balance of physical properties can be readily by one having skill in such rubber compounding art with routine experimentation by adjustment of sulfur and vulcanization accelerator contents and suitable vulcanization times and temperatures without undue experimentation.

In particular, it is preferred that the sulfur vulcanized rubber composition has a suitable stiffness as evidenced by a Shore A hardness (23° C.), (see ASTM D2240), in a range of about 65 to about 75, and a G' loss modulus in a range of about 1.8 to about 2.4 MPa. The G' modulus can be readily be determined by a Metravib™ instrument, Model No. VA3000 at 90° C., 6 percent strain and 7.8 hertz (test method is understood to be similar to ISO 4664 and DIN 53513).

In combination with the rubber composition's stiffness property, it is preferred that the sulfur vulcanized rubber composition has an abrasion resistance as evidenced by a DIN abrasion value of about 75 to about 95 relative volume loss ($mm^3$) at one Newton force, according to DIN 53516/ASTM D5963.

In combination with the rubber composition's stiffness and abrasion resistance properties, it is preferred that the sulfur vulcanized rubber composition has a relatively low heat generation property, particularly for the relatively high stiffness value, as indicated by a hot rebound value (100° C.), of about 65 to about 70 percent and a tan delta (90° C.) in a range of about 0.12 to about 0.16. The hot rebound value can be determined by ASTM D1054 and the tan delta value can be determined by a Metravib™ instrument, Model No. VA3000 at 90° C., 6 percent strain and 7.8 hertz (test method is understood to be similar to ISO 4664 and DIN 53513).

In combination with the rubber composition's stiffness, abrasion resistance and low heat generation properties, it is preferred that the sulfur vulcanized rubber composition has a relatively high damage resistance property, particularly for the relatively high hardness property, as indicated by a relatively high hot tear resistance property (100° C.) of about 25 to about 40 N/mm and a damage resistance index (DRI) in a range of about 13 to about 16 percent. The hot tear resistance property (tear strength) determination is conducted for peal adhesion of a sample to another sample of the same material. A description may be found in ASTM D4393 except that a sample width of 2.5 cm is used and a clear Mylar plastic film window of a 5 mm width is inserted between the two test samples. It is an interfacial adhesion measurement (pulling force expressed in N/mm units) between two layers of the same tested compound which have been co-cured together with the Mylar film window therebetween. The purpose of the Mylar film window is to delimit the width of the pealed area. The DRI property can be determined by the formula: DRI=(G'/(300 percent modulus))×(100). This property is considered herein to be measure, or indication of the cracking and tear propagation resistance of the compound. In practice, the 300 percent modulus value, (see Ring Modulus ASTM D412), of the sulfur vulcanized rubber composition may range, for example, from about 13.8 to about 15 MPa.

It is considered herein that a significant aspect of the invention is the tread of a rubber composition having an optimized combination of the hardness and abrasion resistance physical properties while maintaining an acceptable heat generation capacity as evidenced by a hot rebound (100° C.) value and a relatively high damage resistance index (DRI) and hot tear resistance.

This is considered herein to be significant because the natural rubber-rich rubber composition for a tire tread is provided with a significant and beneficially balanced compromise of stiffness, abrasion resistance, heat generation and damage resistance index properties.

Significant factors in achieving the beneficial balance of physical properties is considered herein, in one aspect, to be largely attributable to the high natural rubber content of the rubber composition which aids in promoting stiffness, damage resistance and heat durability together with the cis 1,4-polybutadiene rubber and emulsion polymerization prepared styrene/butadiene rubber and together with the significantly high structure rubber reinforcing carbon black and precipitated silica, together with its coupling agent.

Accordingly, for one aspect of the invention, a tire is provided having a tread of a sulfur vulcanized rubber composition having a balance of physical properties as:

(1) A Shore A hardness (23° C.) in a range of about 66 to about 72, (2) A G' value in a range of about 1.8 to about 2.4 MPa, (3) A DIN abrasion resistance (1 N) ($mm^3$ relative volume loss) in a range of about 73 to about 99, (4) A rebound value (100° C.) in a range of about 64 to about 70 percent, (5) A tan delta (90° C.) value in a range of 0.12 through 0.16, (6) A hot tear resistance value (100° C.) in a range of about 25 to about 40 N/mm, and (7) A damage resistance index (DRI) in a range of about 13 to about 16 percent.

It is considered herein that a significant aspect of this invention is the above compromised balance, for a vehicular tire tread, between stiffness, abrasion resistance, heat generation and damage resistance index by use of the natural rubber-rich and selected rubber reinforcing carbon black and precipitated silica containing rubber composition.

It is considered herein that a significant aspect of this invention insofar as promoting a Shore A hardness value and G' value in the indicated range is the high natural rubber content of the rubber composition composed of three elastomers together with the indicated selective reinforcement loading of carbon black and precipitated silica, with the majority being a high structure carbon black.

It is considered herein that a significant aspect of this invention insofar as promoting a DIN abrasion resistance value, hot tear resistance value and damage resistance index (DRI) is a contribution of relatively high reinforcing filler loading and selection of reinforcing filler types as well the selection of the respective elastomers.

It is considered herein that a significant aspect of this invention insofar as promoting a rebound (100° C.) value and the tan delta (90° C.) value is the relatively high silica reinforcing filler loading if the indicated precipitated silica together with its coupling agent.

It should readily be understood by one having skill in the art that rubber compositions for components of the pneumatic tire, including the fillers can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as rubber processing oils, resins including tackifying resins, silicas and plasticizers, fillers, pigments, or other materials such as tall oil resins, zinc oxide, waxes, antioxidants and antiozonants, peptizing agents and reinforcing materials such as, for example, the indicated high structure carbon black and precipitated silica. As known to those skilled in the art, depending on the intended use of the sulfur vulcanizable and sulfur-vulcanized materials (rubbers), the certain additives mentioned above are selected and commonly used in conventional amounts.

Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine, may collectively comprise about 1 to 10 phr, with a minimum tackifier resin, if used, being 1 phr and a minimum stiffener resin, if used, being 3 phr. Such resins may sometimes be referred to as phenol formaldehyde-type resins. Typical amounts of processing aids comprise about 4 to about 10.0 phr. Typical amounts of antioxidants comprise 1 to about 5 phr. Representative antioxidants may be, for example, diphenyl-p-phenylenediamine and others, such as those disclosed in The Vanderbilt Rubber Handbook (1978), pages 344–346. Suitable antiozonant(s) and waxes, particularly microcrystalline waxes, may be of the type shown in *The Vanderbilt Rubber Handbook* (1978), Pages 346 and 347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention, so long as the aforesaid physical properties of the tread are met.

The vulcanization of the rubber composition(s) is/are conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with a range of from 2 to about 5 being preferred for the stiff rubbers desired for use in this invention.

Accelerators are used to control the time and/or temperature required for vulcanization and to improve the properties of the vulcanizate. In one embodiment, a single accelerator system may be used; i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05 to 0.50 phr), in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two or more accelerators are preferred for the high stiffness rubbers.

The tire containing the tread rubber composition of this invention can be built, shaped, molded and cured by various methods that will be readily apparent to those having skill in the art.

This invention is illustrated by the following examples that are merely for the purpose of illustration and are not to be regarded as limiting the scope of the invention or the manner in which it can be practiced. Unless specifically indicated otherwise, parts and percentages are, which may be rounded, given by weight.

EXAMPLE I

Sulfur curable rubber compositions are prepared which are comprised of cis 1,4-polyisoprene natural rubber, cis 1,4-polybutadiene rubber and emulsion polymerization prepared styrene/butadiene rubber as well as high structure carbon black, precipitated silica and coupling agent.

Control Sample A is provided as a control rubber composition comprised of the cis 1,4-polyisoprene rubber, cis 1,4-polybutadiene rubber and high structure rubber reinforcing carbon black as N121, an ASTM designation referenced in said hereinbefore referred to *Vanderbilt Rubber Handbook* on Page 417 which recites typical Iodine and DBP values for such carbon black.

Sample B is comprised of a natural rubber rich elastomer composition, including reinforcing filler as a high structure rubber reinforcing carbon black as the ASTM designated N121 carbon black, precipitated silica and coupling agent, where the high structure carbon black is the majority of the reinforcing filler.

The Samples were prepared by mixing the ingredients in an internal rubber mixer in a non-productive (without sulfur and accelerators) mixing step followed by a productive (with sulfur and accelerator addition at a lower mix temperature) mixing step. The rubber compositions were dumped from the rubber mixer after each mixing step, sheeted out from an open mill and allowed to cool to below 40° C. after each mixing step. The ingredients were mixed in the non-productive mixing step for about 2 minutes to a temperature of about 145° C. The subsequent productive mixing step was conducted for about 2 minutes to a temperature of about 115° C.

Table 1 illustrates the ingredients used for preparing the rubber compositions of Control Sample A and Sample B.

TABLE 1

| | Control Sample A | Sample B |
|---|---|---|
| Non-Productive Mixing Step (to 145° C.) Common Materials | | |
| Cis 1,4-polyisoprene rubber[1] | 80 | 80 |
| Cis 1,4-polybutadiene rubber[2] | 20 | 10 |
| Styrene/butadiene rubber[3] | 0 | 10 |
| High structure carbon black[4] | 46 | 32 |
| Precipitated silica[5] | 0 | 27 |
| Coupling agent[6] | 1.5 | 3.5 |
| Antioxidant[7] | 2 | 1.5 |
| Fatty acid[8] | 4 | 3 |
| Paraffinic processing oil | 0 | 2 |
| Zinc oxide | 5 | 3 |
| Productive Mixing Step (to 115° C.) | | |
| Accelerator(s)[9] | 1.3 | 2 |
| Sulfur | 1.3 | 1 |

[1]Natural cis 1,4-polyisoprene rubber having a cis 1,4-content of at least 96 percent and a Tg of about −65° C.
[2]Cis 1,4-polybutadiene rubber obtained as Budene 1207 from The Goodyear Tire & Rubber Company having a cis 1,4-content of at least 96 percent and a Tg of about −100° C.
[3]Styrene/butadiene copolymer rubber as Plioflex 1502NN(tm) from The Goodyear Tire & Rubber Company having a styrene content of about 23.5 percent and a Tg of about −50° C. prepared by aqueous emulsion polymerization of styrene and 1,3-butadiene monomers.
[4]N121 carbon black, an ASTM designation
[5]Zeosil 1165MP ™ from the Rhodia Company having a BET nitrogen surface area within a range of about 140 to about 180 $m^2/g$
[6]Composite of coupling agent as Si69 ™ as a bis (3-triethoxysilylpropyl) polysulfide containing from an average of about 3.5 to about 4 connecting sulfur atoms in its polysulfidic bridge, which may sometimes be referred to as a tetrasulfide, on carbon carrier in a 50/50 weight ratio, from Degussa-Hulls and reported in the Table on a basis of the composite of coupling agent and carbon black.
[7]Amine based antidegradant
[8]Primarily stearic acid which also contains oleic and linoleic acids
[9]Sulfenamide based accelerator The rubber compositions of Table 1 were cured for about 32 minutes at about 150° C. Various resulting physical properties are shown in the following Table 2.

TABLE 2

| Visco Analyzer (7.8 Hertz, 90° C., 6% strain)[1] | Control Sample A | Sample B |
|---|---|---|
| G' (MPa) | 1.6 | 2.1 |
| Tan delta | 0.13 | 0.14 |
| Modulus, 300 percent (MPa) | 13 | 14.6 |
| Ultimate elongation (percent) | 480 | 470 |
| DIN abrasion ($mm^3$ loss at 23° C.) | 110 | 86 |
| Shore A hardness (23° C.) | 64 | 69 |
| Hot rebound (100° C.) | 69 | 67 |
| Tear resistance (N/mm) | 22 | 30 |
| Damage resistance index (DRI) | 12.3 | 14.4 |

[1]The Visco Analyzer is an analytical instrument used for measuring G' and tan delta values for rubber samples, obtained as Model Number VA3000 from the Metravib Company. For these Samples, the instrument was operated and the data was taken at a frequency of 7.8 Hertz and a 6 percent strain for the sample, at a temperature of 90° C.

From Table 1, it can be seen that cis 1,4-polyisoprene natural-rich Samples were prepared with a high structure carbon black as N121. Sample B also contained a precipitated silica, with a coupling agent. The elastomer selection and amounts and the reinforcing filler selection and amounts for Sample B is considered herein to be important for promoting a beneficial compromise of physical properties of the sulfur vulcanized Sample B, namely the stiffness (G' and Shore A hardness), abrasion resistance, heat generation (Hot rebound and tan delta), and damage resistance (tear resistance and DRI) values.

From Table 2, it can be seen that, for Sample B, (A) a relatively high level of stiffness was obtained (Shore A hardness of 69 as compared to 64 for the Control, and G' of 2.1 MPa as compared to 1.6 for the Control), (B) a satisfactory DIN abrasion resistance was obtained of only 86 as compared to 110 for the Control, and (C) a satisfactory damage resistance was obtained (tear resistance of 30 as compared to 22 for the Control and DRI of 14.4 as compared to 12.3 for the Control).

These beneficial physical properties were obtained without a significant negative impact upon heat generation (hot rebound of 67 as compared to 69 for the Control and tan delta at 90° C. of 0.14 as compared to 0.13 for the Control). This is considered to be significant because it is considered herein that such compromise of physical properties (the beneficial properties in combination with substantially maintaining the aforesaid heat generation properties) for a tire tread rubber composition will aid in providing a tread of a combined treadwear resistance, chip and chunking resistance and tire handling performance without significantly negatively affecting the tire tread rubber durability, namely heat durability.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire having an outer circumferential tread of a natural rubber-rich, carbon black-rich, silica-containing sulfur cured rubber composition which comprises, based upon parts by weight per 100 parts by weight elastomer (phr):

(A) diene-based elastomers as:

(1) about 70 to about 90 phr of cis 1,4-polyisoprene natural rubber having a cis 1,4-content of at least 96 percent and a Tg in a range of about −60° C. to about −70° C., (2) about 5 to about 15 phr of cis 1,4-polybutadiene rubber having a cis 1,4-content of at least 96 percent and a Tg in a range of about −90° C. to about −110° C., and (3) about 5 to about 15 phr of an emulsion polymerization prepared styrene/butadiene copolymer rubber having a styrene content in a range of from about 20 to about 25 weight percent and a Tg in a range of about −40° C. to about −60° C., (B) about 48 to about 76 phr of particulate reinforcing filler as rubber reinforcing carbon black and precipitated silica composed of about 25 to about 40 phr of said carbon black and wherein the weight ratio of said carbon black to said silica in a range of about 1.1/1 to 1.3/1, wherein:

(1) said carbon black has an Iodine value in a range of from about 110 to about 130 mg/g and a dibutyl phthalate (DBP) value in a range of from about 120 to about 140 ml/100 g, and (2) said silica has a nitrogen surface area value (BET) in a range of about 140 to about 180 $m^2/g$, and (C) a coupling agent having a moiety reactive with hydroxyl groups contained on the surface of said precipitated silica and another moiety interactive with said diene-based elastomers as a bis-(3-triethoxysilylpropyl) polysulfide having an average of from 2 to 2.6 or from 3.5 to 4 connecting sulfur atoms in its polysulfidic bridge;

wherein said sulfur cured tire tread rubber composition has a balance of physical properties as:

(1) A Shore A hardness (23° C.) in a range of about 66 to about 72, (2) A G' (90° C., 7.8 Hertz and 6 percent strain) value in a range of about 1.8 to about 2.4 MPa, (3) A DIN abrasion resistance (1 N)($mm^3$ relative volume loss) in a range of about 73 to about 99, (4) A rebound value (100° C.) in a range of about 64 to about 70 percent, (5) A tan delta (90° C., 7.8 Hertz and 6 percent strain) value in a range of 0.12 through 0.16, (6) A hot tear resistance value (100° C.) in a range of about 25 to about 40 N/mm, and (7) A damage resistance index (DRI) in a range of about 13 to about 16 percent.

2. The tire of claim 1 wherein said coupling agent is a bis-(3-triethoxysilylpropyl) polysulfide having an average of from 3.5 to 4 connecting sulfur atoms in its polysulfidic bridge.

3. The tire of claim 1 wherein said carbon black is an N121 (ASTM designation) rubber reinforcing carbon black.

4. The tire of claim 3 wherein said carbon black has an iodine value of about 120 mg/g and a DBP value of about 130 ml/100 g.

* * * * *